United States Patent [19]

Beckers

[11] 4,414,659

[45] Nov. 8, 1983

[54] METHOD AND APPARATUS FOR ENCODING DIGITAL DATA SO AS TO REDUCE THE D.C. AND LOW FREQUENCY CONTENT OF THE SIGNAL

[75] Inventor: Hubertus F. M. Beckers, Eindhoven, Netherlands

[73] Assignee: U.S. Philips Corporation, New York, N.Y.

[21] Appl. No.: 259,796

[22] Filed: May 4, 1981

[30] Foreign Application Priority Data

Jun. 16, 1980 [NL] Netherlands .......................... 8003476

[51] Int. Cl.$^3$ ........................... G11B 7/00; G11B 5/09
[52] U.S. Cl. ........................................ 369/59; 360/40; 371/57; 375/76
[58] Field of Search ....................... 369/48, 59; 360/40, 360/43, 44; 371/55, 57; 375/25, 76; 340/347 DD

[56] References Cited

U.S. PATENT DOCUMENTS

| | | | |
|---|---|---|---|
| 3,810,111 | 5/1974 | Patel | 371/57 |
| 3,905,029 | 9/1975 | McIntosh | 360/44 X |
| 4,027,335 | 5/1977 | Miller | 360/40 |
| 4,183,066 | 1/1980 | Anderson | 360/40 |
| 4,227,184 | 10/1980 | Howells et al. | 360/43 X |
| 4,234,897 | 11/1980 | Miller | 360/40 X |
| 4,326,282 | 4/1982 | Verboom et al. | 369/48 |

FOREIGN PATENT DOCUMENTS

| | | | |
|---|---|---|---|
| 32271 | 7/1981 | European Pat. Off. | 369/59 |
| 55-150111 | 11/1980 | Japan | 360/40 |
| 2038058 | 7/1980 | United Kingdom | 369/59 |

OTHER PUBLICATIONS

"Optimal Codes for Digital Magnetic Recording"; Mallinson et al, Radio and Electronic Engr. vol. 47, No. 4 pp. 172-176 Apr. 1977.

*Primary Examiner*—Aristotelis M. Psitos
*Attorney, Agent, or Firm*—Thomas A. Briody; Robert T. Mayer; Algy Tamoshunas

[57] ABSTRACT

An encoding system in which starting from the Miller code a specific word type in the bit series is detected and two bits within said word type are encoded in a different manner in order to obtain an information signal without d.c. component. Moreover, an encoding device, a record carrier provided with such an information signal and a read apparatus provided with a suitable decoding device are described.

4 Claims, 19 Drawing Figures

METHOD AND APPARATUS FOR ENCODING DIGITAL DATA SO AS TO REDUCE THE D.C. AND LOW FREQUENCY CONTENT OF THE SIGNAL

The invention relates to a method of encoding a stream of data bits in consecutive bit cells in a transmission system for recording and reproducing a recording signal of a record carrier. The bit stream is assumed to be comprised of consecutive words of a first and a second type and the data bits being of a first or a second type. The second type of words comprise at least a sequence of one data bit of the second type followed by m (m≧0) data bits of the first type, the data bits of the first type normally are encoded by a level transition in the middle of the relevant bit cell and data bits of the second type normally are encoded by a transition at the beginning of the relevant bit cell, whilst each transition at the beginning of a bit cell followed by a transition in the middle of the immediately preceding bit cell is suppressed and words of the second type with an even number of m transitions of data bits of the first type are modified so as to reduce the d.c. component in the binary signal.

Such a method is known from U.S. Pat. No. 3,810,111.

Binary data comprise data bits which contain information in the form of either the one of the other of two types. The one type is sometimes represented as "logic one", as "true", as "yes" or as "+" and the other type is also represented as "logic zero", as "not true", as "no" or as "−". In order to transfer these data bits via a transmission channel or to record them on a magnetic tape or an optical disk, the data bits are generally modified—a process which is known as channel coding. The purpose of this channel coding is, for example, to obtain a maximum information density on the record carrier or to make the d.c. content of the encoded signal zero without enlarging the required bandwidth.

The encoded data bits are each accommodated in an interval referred to as bit cell. This bit cell may be a time interval (in the case of transmission via an information channel) or a spatial interval (in the case of recording on a tape or disk).

A known method of channel coding is the so-called Miller modulation. The code rules of this modulation are: a "one" data bit is encoded as a level transition in the middle of a bit cell, and a "zero" data bit yields a transition at the beginning of the bit cell, except in the case that a logic zero follows a logic one. The Miller code, also known as "delay modulation", is consequently a binary code in which the location of the transitions between two levels defines the meaning of the binary information.

For the invention it is immaterial which transition is associated with a "logic one" and which transition with a "logic zero". Furthermore the exact location of the transitions in the bit cell is not important, provided that one transition is situated comparatively early and one transition comparatively late in the bit cell so that they can be distinguished unambiguously from each other. For simplicity all these possibilities will be referred to as "in the middle of the bit cell" and "at the beginning of the bit cell".

One drawback of the Miller modulation is that the signal which is obtained is not free of d.c. components. In order to mitigate this drawback it is proposed in said U.S. Patent to modify the Miller modulation. For this purpose the stream of data bits is regarded as comprising sequences of words of two types, namely of type (a) 011 ... 110 (one zero, n ones and one zero, with n≧0) and of type (b) 111 ... 111 (m ones). The words of type (b) and the words of type (a) if n is odd do not contribute to a d.c. component and are therefore encoded by the customary Miller method. Only the words of type-(a) where n is even give rise to a d.c. component and are subject to a modified coding. In accordance with said U.S. Patent the modification consists in the ones of such a type-(a) word being divided into pairs and a transition being introduced for each pair at the beginning and the end of said pair. This ensures that a type-(a) word thus encoded no longer contains a d.c. component.

The Miller code thus modified has a frequency spectrum which is d.c. free and whose content of very low frequencies is reduced to a certain extent in comparison with the frequency spectrum of the Miller code.

When an optical disk is employed as the record carrier, for example an optically readable audio disk, the reduced content of low frequency components is of particular importance.

In this respect an optical record carrier is to be understood to mean a record carrier, disk tape etc., in which the information is recorded in an information track in an optionally readable manner. This information track may then inter alia have a high-low structure or a black-white structure. For both structures reference will be made hereinafter to two possible levels in order to indicate that the respective structure is high or low and black or white.

In handling such a record carrier the surface may, for example, become scratched, which when the record carrier is played may give rise to spurious low-frequency signals in the signal being read. If the content of low-frequency signals in the recording signal is very small, any spurious signals can be extracted from the information signal by filtering. On the other hand, for reading an optical disk servo-systems are employed which inter alia serve to ensure that the optical scanning spot remains focussed at the information surface and that said scanning spot follows the information track. These servo-systems employ control signals which are derived from signals obtained via the scanning spot. Such control signals have a frequency which is situated in a frequency band which coincides with the low-frequency portion of the frequency spectrum of the recording signal, so that strong signal components in this frequency range may give rise to spurious signals in the control signals.

It is the object of the invention to provide a method of encoding data bits on a record carrier, which yields a d.c. free recording signal with greatly reduced content of low-frequency components.

It is a further object of the invention to provide a method of encoding data bits on a record carrier, yielding a record carrier with an information signal which can very simply be decoded during read-out.

The method in accordance with the invention is therefore characterized in that in words of the second type for which m is even the transition in the middle of the bit cell corresponding to the first and the second data bit of the first type is suppressed and a transition is provided at the beginning of the second data bit.

A preferred embodiment of the method in accordance with the invention is characterized in that the words of the first type comprise a sequence of n (n≧1)

data bits of the second type and that for words of the second type m≧1.

The steps in accordance with the invention first of all ensure that a record carrier with an information signal thus encoded can be read by means of a very simple decoding device. Secondly, the content of lower frequencies in the information signal is very small over a comparatively wide band.

The invention furthermore relates to a device for carrying out the method, which device is characterized in that the device is provided with a first input for receiving the binary data bits;

a second input for receiving a clock signal which is in synchronism with the data bits;

an output for supplying the encoded signal to a recording device for a record carrier;

means for generating a signal transition in the middle of a clock interval in the case of a data bit of the first type;

means for generating a signal transition at the beginning of a clock interval in the case of a data bit of the second type;

means for suppressing a transition at the beginning of a clock interval following a transition in the middle of the immediately preceding clock interval;

means for detecting a word of the second type where m is even;

means for suppressing the transitions in the middle of the clock interval corresponding to said first and second bit of the first type in a word of said second type where m is even;

and means for generating a transition at the beginning of the clock interval corresponding to said second bit of the first type in a word of the second type where m is even.

The invention also relates to a record carrier provided with an information structure comprising sequences of bit cells, which bit cells each contain an information bit, whose information content is represented by the presence or absence of a level transition in the middle or at the beginning of the bit cell. The record carrier in accordance with the invention is characterized in that the minimum distance between two consecutive level transitions is equal to the length of one bit cell, that the maximum distance between two consecutive transitions is equal to the length of three bit cells, that a transition in the middle of a bit cell represents a "logic one" and a transition at the beginning of a bit cell normally represents a "logic zero" unless the same level appears in two consecutive bit cells, in which case the second one of the said consecutive bit cells and the bit cell preceding it each represent a "logic one", and that the running integral of the information structure assumes a value of at the most 2T, T being the length of the bit cells and that the level transitions which are a spaced from each other by a maximum distance of three bit cells mark the beginning of the bit cell.

Finally, the invention also relates to an apparatus for reading such a record carrier. This apparatus is characterized in that the apparatus is provided with detection means for detecting the pairs of modified bit cells and converting said two bit cells into two data bits of logic value one, and means for converting the other bit cells into data bits in accordance with the normal Miller decoding rules.

A preferred embodiment of this apparatus, by means of which decoding is effected in a very simple manner, is characterized in that the apparatus is provided with means for converting a bit cell with a transition in the middle of the bit cell into a data bit of logic value "one"

means for converting a bit cell with a transition at the end into a data bit with a logic value which is the inverse of that of the decoding preceding data bit if the preceding data bit has no transition in the middle and no transition at the end, and into a data bit of logic value "zero" if the preceding bit cell does exhibit one of said transitions, and means for converting a bit cell without transition in the middle and at the end into a data bit with a logic value identical to that of the decoded preceding data bit if the preceding bit cell exhibits a transition at the end into a data bit of the logic value "zero" of said preceding bit cell does not exhibit said transition at the end.

The invention will now be described in more detail with reference to the drawing, in which:

FIG. 1, a–j, represents a number of signal waveforms

FIG. 2 represents the frequency spectrum of two information signals

FIG. 3, including 3a and 3b, show an embodiment of an encoding device in accordance with the invention, and FIG. 4 shows an example of detector employed in said encoding device.

FIG. 5 by way of illustration shows an embodiment of a record carrier in accordance with the invention, and FIG. 6 is a sectional view of said record carrier.

Figure 1:
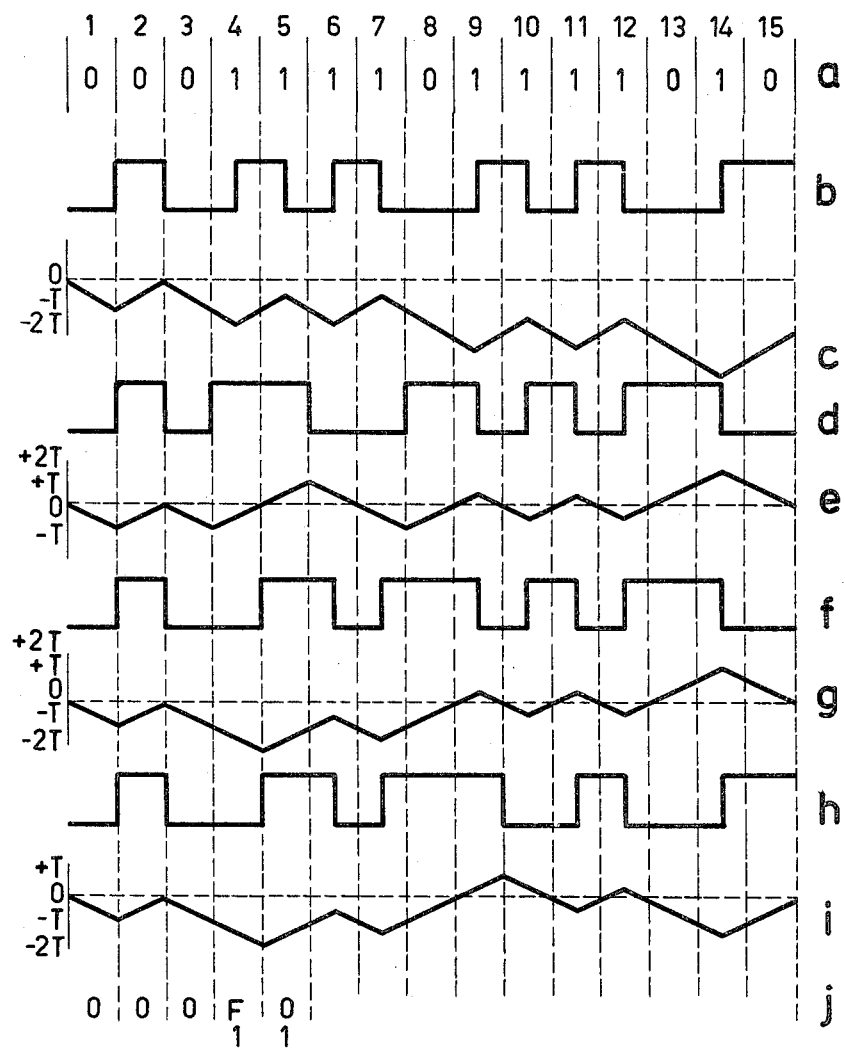
FIG. 1a represents a plurality of consecutive bit cells 1,2,3, . . . 15 in which binary information signals can be stored, namely one bit per bit cell. By way of illustration a sequence "0" and "1" bits is shown.

FIG. 1b by way of illustration shows the information signal which is obtained if the binary sequence of FIG. 1a is encoded in accordance with the Miller code. An information bit of logic "1" content is then encoded as a signal transition in the middle of the relevant bit cell and an information bit of logic "0" content as a level transition at the beginning of the bit cell, except when said "0" bit immediately follows a "1" bit.

The Miller code illustrated in FIG. 1b is not d.c. free, that is it may contain a d.c. component. FIG. 1c represents the so-called d.s.v. (digital sum variation) of the signal of FIG. 1b, that is the running integral of the area underneath the encoded data, the binary levels being +1 and −1 respectively. The length of each bit cell is T. It is evident from FIG. 1b that in the case of the bit series shown a certain growing d.c. component is produced.

In order to eliminate this d.c. component U.S. Pat. No. 3,810,111 has proposed a modification to the Miller coding. A stream of data bits is then regarded as comprising consecutive words of a type (a) and a type (b). A type-(a) word comprises n ones bounded on tooth sides by a 0, hence 011 . . . 110 (n≧0) and a type-(b) word comprises a number of ones, i.e. 11 . . . 11 (n≧1). Both the type-(a) words where n is odd and the type-(b) words do not contribute to the d.c. component and are consequently encoded in accordance with the normal Miller code. Only type-(a) words where n is even give rise to a d.c.-component. In order to eliminate this d.c. component a modification to the Miller code is adopted for this type of word. Specifically, the series of ones in this type of word is divided into consecutive pairs and a transition is introduced at the beginning and end by each pair. For the bit series in accordance with FIG. 1a the following word organisation is valid: type (a) n=0 (bits 1+2); type (a) n=4 (bits 3-8); type (b) n=4 (bits 9-12); type (a) n=1 (bits 13-15). This organization results in an information signal in accordance with FIG. 1d, the word comprising the bits 3-8 being modified as indicated. As is apparent from the d.s.v. of said information signal represented in FIG. 1e, said information signal does not contain a d.c. component.

Apart from the absence of a d.c. component in the information signal recorded on a record carrier other factors play an important part with respect to the coding used. Especially for consumer applications it is desirable that the coding is such that in the read apparatus by means of which the record carrier is read the decoding circuit which is employed is as simple as possible. Furthermore, especially in the case of optical record carriers, it is not just the d.c. component itself which is of importance but, in view of cross-talk between the information signal and the servo-signals of comparatively low frequency for the various servo-systems employed for the optical read process and the influence of surface flaws on the quality of the information signal being read, it is of importance that the low-frequency content of said information signal is very small over a comparatively wide band.

For this purpose the invention proposes a different modification to the Miller code. FIGS. 1f and 1h represent two information signals as obtained in accordance with two possibilities of the Miller code modification in accordance with the invention.

The information signal of FIG. 1f is obtained by employing exactly the same division of the bit series as for the known Miller modification in accordance with said U.S. Patent. However, a type-(a) word where n is even (bits 3-8) is modified in a different manner. Specifically, only the two first "1" bits (bits 4 and 5) of such a word are modified, said two bits being encoded with one transition at the boundary of the two bits. The remaining "1" bits (bits 6 and 7) of this type-(a) word are encoded in accordance with the normal Miller code, in contradistinction to the known modification. It follows from the d.s.v. represented in FIG. 1g of this information signal of FIG. 1f that the d.c. component is zero.

Alternatively, a modification of the division of the bit series into word types can be used in the coding so as to obtain the information signal illustrated in FIG. 1h. For the word organization, essentially only one specific word type is detected, namely a word comprising one zero, followed by an even number (n) of ones, that is 011...11 (n even). Each word of this type is modified regardless of the position of said word within the bit series. In the bit series of FIG. 1a taken as an example, this means that both the word comprising the bit cells 3-7 and the word comprising the bit cells 8-12 is modified, the latter in contradistinction to the code modifications in accordance with FIGS. 1d and 1f. The modification in itself is identical to that applied to the information signal of FIG. 1f, that is the first two "1" bits (bits 4 and 5 and bits 9 and 10 respectively) are modified. It is apparent from FIG. 1i that for the signal thus modified the d.c. component is also zero. In contradistinction to the known code modification the d.s.v. is not reduced to zero per word, but it is ensured that the mean d.s.v. remains zero.

The code modification in accordance with the invention first of all permits the use of a very simple decoder in the read apparatus. Specifically, it is found possible to achieve a non-ambiguous decoding, for which only the information content of two consecutive bits must be detected, which will be explained hereinafter.

Figure 2:
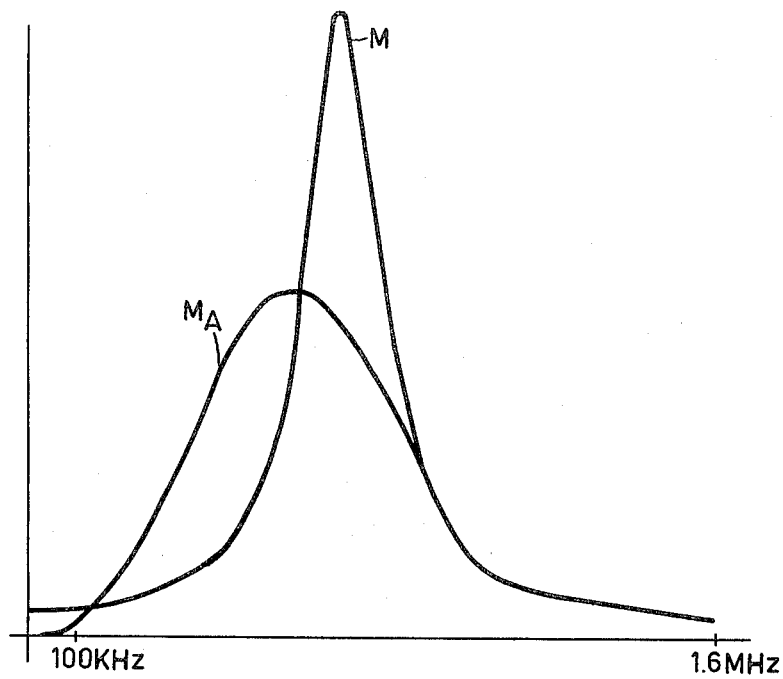

Moreover, it is found that the information signal obtained via the code modification in accordance with the invention has a very small content of comparatively low frequencies over a wide band. It appears in particular that the frequency spectrum of the information signal rises only very slowly from the frequency 0 to approximately 100 kHz. FIG. 2 by way of illustration represents the spectrum of the normal Miller code(M) measured at a bit frequency of 2 Mbit/sec and the spectrum obtained with the coding in accordance with the invention ($M_a$), which clearly shows the differences.

Figure 3:
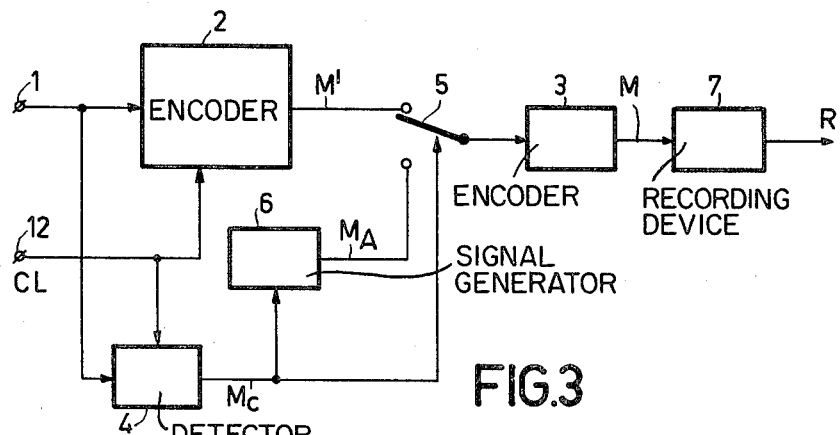

FIG. 3 by way of example represents a block diagram of an encoding device for obtaining an information signal in accordance with FIG. 1h. In this case the word organisation only requires a detection of the occurrence of a word type 011...11 (with an even number of ones).

The device comprises an input terminal 1, to which the binary bit series to be encoded is applied. Said bit series is first of all applied to an encoding device 2, which is adapted to encode the applied bit series in accordance with the normal Miller code.

Via an input 12 the device 2 receives a clock signal CL of bit frequency for the bitwise shifting and encoding of the applied bit series.

It is of course possible to employ any known Miller encoding circuit in order to form such an encoding device. By way of illustration reference is made to U.S. Pat. No. 3,108,261, which describes said Miller code and a suitable encoding device.

Figure 3A:
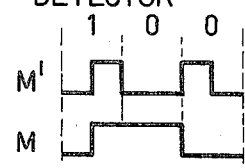

Although it is not essential, it has been assumed for the encoding device in accordance with FIG. 3 that the device 2 does not directly supply an information signal encoded in accordance with the Miller code, but an information signal which does not yield said Miller-coded information signal until it has been processed by an NRZ (non-return-to-zero) encoding device 3. For this purpose the device 2 supplies a signal M', shown in FIG. 3a, each bit being divided in two bit halves and the logic value in each bit half being indicative of the fact whether via the Miller coding a transition should exist in the formation signal at the beginning of the relevant bit half. Thus, a 1-bit does not always result in a 01-level structure of the relevant bit cell, but a "0" bit normally is a 10-level structure, except when said "0" bit is immediately preceded by a "1" bit, in which case a "00"-level structure of the two bit halves is obtained. FIG. 3a shows that after said signal M' has been subject to an NRZ operation, a signal M encoded in accordance with the Miller code is obtained.

In order to carry out the modification in accordance with the invention the device of FIG. 3 comprises a detector 4, which detects the beginning of a word 011...111 with an even number of ones. However, it is obvious that for the practical realization of such a detector there are many possibilities. One of these possibilities will be described later with reference to FIG. 4.

Figure 3B:
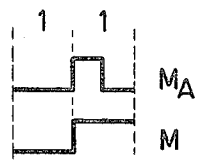

The detector 4 supplies a control signal $M_c$ to the switch 5 with a delay of one bit period after detection of the relevant word type, that is at the beginning of the first "1" bit of said word type, so that said switch is switched over from the output of the encoding device 2 to the output of the signal generator 6 for a time interval corresponding to two bit periods. Said signal generator is activated by the detector 4 simultaneously with the change-over of the switch 5 and then supplies a signal $M_A$, as shown in FIG. 3b, within the two-bit time interval. During the first two "1" bits of the word-type to be modified the NRZ encoding device 3 consequently receives said signal $M_A$, resulting in the desired modified Miller code represented in FIG. 3b. After said two-bit period the switch 5 is reset and the applied signal is again processed in accordance with the normal Miller code. The information signal M which is ultimately obtained in this way is applied to a recording device 7, which records said signal in a suitable manner on a record carrier R, for example a magnetic tape, a magnetic disk or an optical disk.

Figure 4:
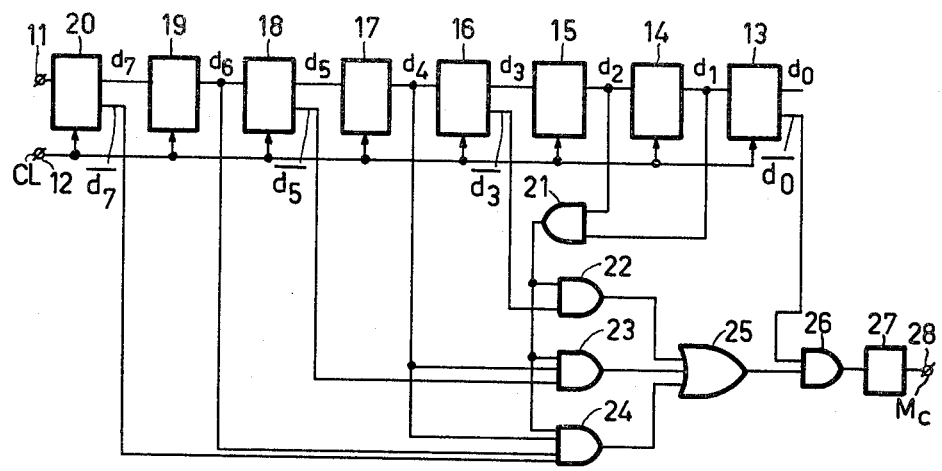

FIG. 4 by way of example shows a version of the detector 4 in the encoding device of FIG. 3. The detector comprises an input terminal 11 to which the binary bit series is applied. Furthermore, the device comprises a number of flip-flops 13–20, which are connected in series and are clocked by a clock signal CL (input 12) having a frequency corresponding to the desired bit frequency. The flip-flops 13–20 consequently contain the signal contents of eight consecutive bits and function as cells of a shift register.

The eight flip-flops 13–20 essentially form part of a larger number of series-connected flip-flops. Indeed, if each type-(a) word with an even number of ones is to be detected, this essentially demands the use of an infinitely long shift register, that is an infinite number of flip-flops. However, in practice the required length of the shift register is substantially smaller. For example, generally a synchronization word is inserted at equidistant positions in the bit series of the information signal. If this known synchronization word contains a "0" bit, this means that the series of consecutive "1" bits can never be longer than the number of bits between said "0" bits of two consecutive synchronization words. Furthermore, the chance of a comparatively large series of consecutive "1" bits is very small, depending on the type of information signal, for example in the case of an audio signal. This means that the length of the shift register, the number of flip-flops, can be reduced on purpose with the risk that in the case of very long words of type (a) an incorrect modification may take place. If a comparatively short shift register is to be used, it is of course also possible to insert dummy "0" bits at equal distances in the binary bit series.

For simplicity of the Figure only eight flip-flops of the complete row are shown. The outputs of said flip-flops represent the levels of eight consecutive bit cells, designated by the outputs $d_0$–$d_7$. In order to detect the occurrence of a type-(a) word with an even number of ones, the detector comprises a number of logic gates, which are connected to the outputs of the flip-flops. The outputs $d_1$ and $d_2$ of the flipflops 14 and 15 are connected to an AND-gate 21, whose output is coupled to three further AND-gates 22, 23 and 24. Furthermore, the AND-gate 22 is coupled to the inverse output $\bar{d}_3$ of the flip-flop 16, the AND-gate 23 to the output $d_4$ of the flip-flop 17 and the inverse output $\bar{d}_5$ of the flip-flop 18, and the AND-gate 24 is furthermore coupled to the outputs $d_4$ of the flip-flop 17 and $d_6$ of the flip-flop 19 and the inverse output $\bar{d}_7$ of the flip-flop 20. The outputs of the AND-gates 22, 23 and 24 are connected to an OR-gate 25, whose output is connected to an AND-gate 26, which is furthermore coupled to the inverse output $\bar{d}_0$ of the flip-flop 13. The output of the AND-gate 26 drives a flip-flop 27, on whose output 28 the control signal $M_c$ is available.

As is apparent from the Figure, the output signal of the AND-gate 22 is indicative of the bit series $d_1d_2d_3=110$. In conjunction with the AND-function of the gate 26 this yields a logic "1" for the flip-flop 27 upon the occurrence of the bit series $d_0d_1d_2d_3=0110$, which is to be modified. Similarly, the AND-gate 26 in conjunction with the output signal of the AND-gate 23 yields a logic signal "1" upon the occurrence of the bit series $d_0$–$d_5=011110$ and in conjunction with the output signal of the AND-gate 24 upon the occurrence of the bit series 01111110.

Flip-flop 27 is adapted to supply a squarewave control signal $M_c$ having a duration equal to two bit-periods for switching over the switch 5 in FIG. 3 and activating the modification generator 6 in FIG. 3 when its input signal assumes a logic "1" level, delayed by one bit period, i.e. coinciding with the beginning of the first "1" bit of the type-(a) word with an even number of ones.

It will be evident that if longer words of type (a) are to be detected the number of flip-flops 13–20 and the number of AND-gates 22–24 should be increased, which additional AND-gates should be coupled to the flip-flops of the shift register in accordance with the same pattern as for the AND-gates 22–24. As is evident from the Figure the AND-gates 22–24 perform the logic functions $d_1d_2\bar{d}_3$; $d_1d_2d_4\bar{d}_5$ and $d_1d_2d_4d_6\bar{d}_7$ respectively. Thus, the next additional AND-gates should perform the logic functions $d_1d_2d_4d_6d_8\bar{d}_9$; $d_1d_2d_4d_6d_8d_{10}\bar{d}_{11}$ etc.

The coding in accordance with the invention is by no means limited to the use of the encoding device as shown in FIGS. 3 and 4. On the basis of the coding rules defined in the coding it is of course possible to realize a multiplicity of logic circuits which in response to an applied bit series ultimately yield an information signal which is encoded in the desired manner. For example, the Miller encoding device 2 and the modification generator 6 of FIG. 1 will generally not be separated completely, but the logic circuits for the two devices will be combined in a suitable manner, as the case may be together with the detector 4.

Figure 5:
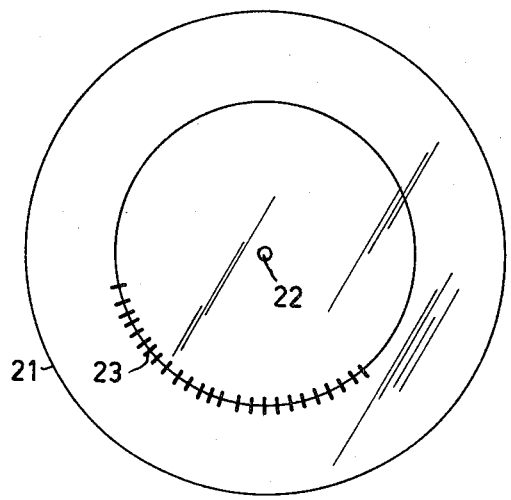

As already stated with reference to FIG. 3 the ultimately obtained encoded signal is recorded on a record carrier. FIG. 5 by way of illustration represents the plan view of an optical disk provided with such a signal and FIG. 6 a sectional view of the information structure of such a disk.

Figure 6:
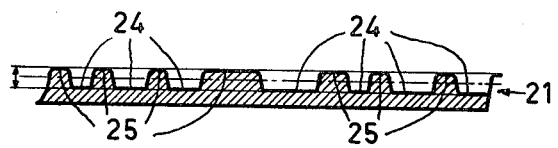

The disk 21 shown in FIG. 5, in whose centre a hole 22 is formed, comprises a plurality of concentric tracks or a spiral track 23. FIG. 5 shows only one circular track, the bit cells being represented—not to scale—by a plurality of sub-division marks. Where said bit cells form a time division in the information signal, they constitute a spatial structure on the disk. The structure as such depends on the modulation used for the record carrier. An optical audio disk which currently attracts much attention employs an information structure comprising a sequence of pits and intermediate areas or lands, as shown in FIG. 6. The pits 24, for example, represent the logic "1" level and the intermediate areas 25 the logic "0" level of the encoded information signal. The structure of pit and intermediate area thus directly represents the information signal. Such a record carrier is particularly suitable for being copied and can simply be read in an optical manner, the optimum pit depth depending on the read process (reading in reflection; in transmission; single-spot reading; divided spot reading).

Regardless of the contents of the information signals the record carrier exhibits a number of special features. These special features will be described hereinafter for a record carrier provided with an information structure which is encoded in accordance with the inventive code. For example, the minimum distance between two consecutive transitions from pit/non-pit to non-pit/pit is equal to one bit cell (see the bit cells 2 and 6/7 in FIG. 1h). The maximum distance between two consecutive transitions is equal to three bit cells. Furthermore, distances occur which are situated between said two extremes, namely distances of $1\frac{1}{2}$, 2 and $2\frac{1}{2}$ times the length of one bit cell. As the maximum distance is comparatively short, the signal read from the carrier always contains a sufficient number of transitions, so that the coding may be regarded as self-clocking. Since on the other hand the minimum distance is not smaller than the length of one bit cell, it is possible to realize a suitable information density on the carrier. Another characteristic of the patterns on the record carrier is that the transition which marks the beginning of the maximum distance of three bit cells is always situated at the beginning of a bit cell. This also applies to the transition which marks the end of the maximum distance. Thus, it is possible to ascertain unambiguously which transitions in the carrier should be regarded as situated in the middle of a bit cell and at the beginning of a bit cell. Furthermore, it is essential that the modification used in order to obtain a d.c. free coding with a small low-frequency content can be decoded unambiguously. However, this can be done unambiguously using transition/non-transition patterns which are only present on the carrier. If in the case of a decoding as that in accordance with Miller an "impossible" bit value is found, a value "one" should be assigned to said bit and to the next bit. This is illustrated in FIG. 1j. The waveform shown in FIG. 1h is decoded in accordance with the Miller method and then yields the result 000 for the bit cells 1 through 3 and a 0 for the bit cell 4, which cannot be a zero because in accordance with the Miller code a zero following a zero should have a transition at the beginning of the bit cell, which transition is missing in the present case. The decoding result of bit cell 4 is designated F in FIG. 1j. By substituting a "one" for the bit cell marked F and a "one" for the bit cells immediately following it, as is shown in FIG. 1j, the decoded data signal becomes identical to the encoded data signal.

FIG. 6 is a sectional view perpendicular to the carrier shown by way of example in FIG. 5, which sectional view follows the track direction. In the information surface of the carrier 1 a plurality of pits 24 are formed and the pattern of pit (24)/non-pit (25) thus represents the binary information recorded on this track.

As already stated in the foregoing, a possible decoding method effects decoding in accordance with the normal Miller rules, whilst in the case of an "impossible" bit said bit and the next bit are interpreted as a "1".

However, the code in accordance with the invention makes it possible to employ a very simple decoding. An embodiment of a device for carrying out this decoding method is represented in FIG. 7.

Figures 7, 8:
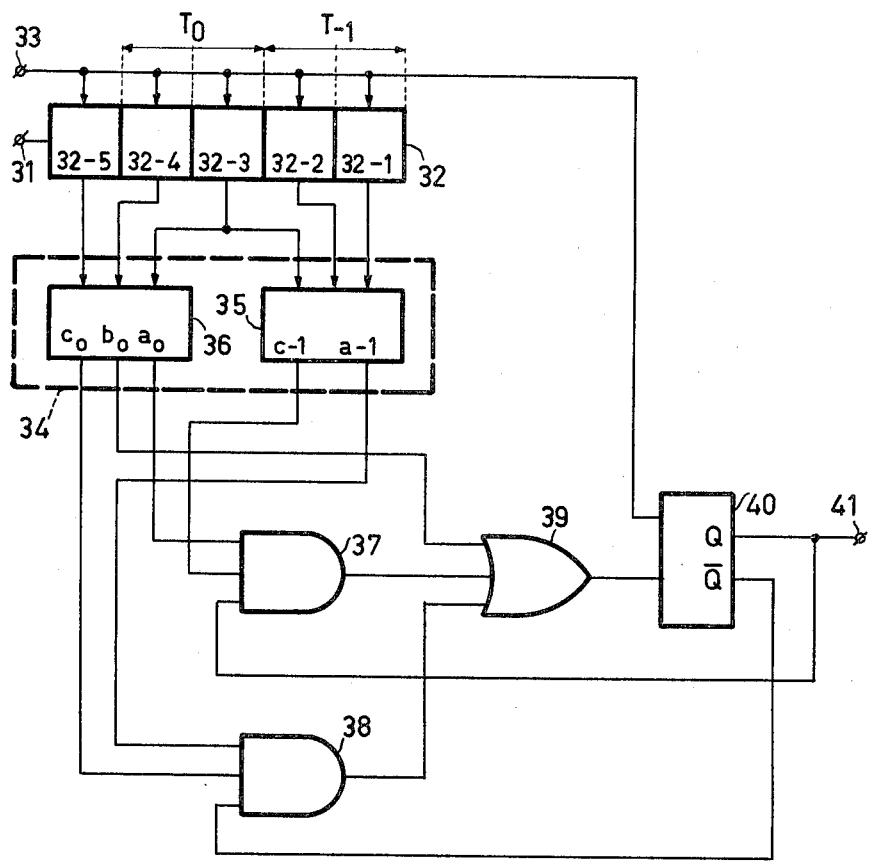
FIG. 7 shows an embodiment of the decoding device in accordance with the invention.
FIG. 8 shows an associated decision table.

The device of FIG. 7 first of all comprises a shift register 32 with 5 register cells, to which the information signal read is applied via an input terminal 31. The shift register is adapted to take up the signal content of $2\frac{1}{2}$ bit cell, each bit cell 32-1 through 32-5 containing the signal level of one bit-cell half. The shift register is clocked in such a way that the register cells 32-1 and 32-2 contain the levels of the two bit halves of a first bit ($T_{-1}$), the register cells 32-3 and 32-4 the levels of the two bit halves of the next bit cell ($T_0$) and the register cell 32-5 the level of the first bit half of a subsequent bit cell ($T_1$).

The register cells 32-1 through 32-5 are connected to a detection device 34. Said detection device 34 comprises a first decision circuit 35, which is connected to the register cells 32-1 through 32-3 and a second decision circuit 36, which is connected to the register cells 32-3 through 32-5. Each of the decision circuits 35 and 36 is adapted to detect whether and, if so, where in the relevant bit cell $T_{-1}$ or $T_0$ a transition occurs. For this purpose the signal levels of the relevant register cells are compared with each other. If the signal levels of the register cells 32-3 and 32-4 are unequal, this means that the data bit $T_0$ exhibits a transition in the middle of the bit cell. The decision circuit 36 then supplies a logic "1" on its output $b_0$. If the signal levels in the register cells 32-4 and 32-5 are unequal, this means that the data bit $T_0$ has a transition at the end of the bit cell. The decision circuit 36 then supplies a logic "1" on its output C. Finally, if the signal levels of the register cells 32-3, 32-4 and 32-5 are all equal, this means that the data bit $T_0$ contains no transition. The decision circuit 36 then supplies a logic "1" on its output $a_0$. The decision circuit operates identically for the register cells 32-1 through 32-3, i.e. with respect to the data bit $T_{-1}$, with the proviso that said decision circuit need not comprise an output $b_{-1}$.

The data signal is decoded on the basis of the signals on the outputs of said decision circuits 35 and 36. For this purpose the decoding device comprises an AND-gate 37, whose two inputs are connected to the output $C_{-1}$ of the decision circuit 35 and the output $a_0$ of the decision circuit 36. The two inputs of a second AND-gate are connected to the respective outputs $a_{-1}$ and $C_0$ of the decision circuits 35 and 36. The outputs of said AND-gates 37 and 38 are connected to two inputs of an OR-gate 39, of which a third input is connected to the output $b_0$ of the decision circuit 36. The output of said OR-gate 39 is connected to a flip-flop, which is clocked by the clock signal from input 33 and whose output signal Q consequently corresponds to its input signal during the preceding data bit. Said Q-output is connected to an input of the AND-gate 37 and to an output terminal 41. The inverse output $\bar{Q}$ of the flip-flop 40 is connected to an input of the AND-gate 38.

The device shown in FIG. 7 realizes the decoding of the applied data bits in accordance with the diagram of FIG. 8. If the decision circuit 36 supplies an output signal $b_0=1$ for the data bit $T_0$, the OR-gate 39 will always supply a logic "1" level regardless of the outputs of the decision circuit 35, i.e. a decoded "1" bit. If the decision circuit 36 supplies an output signal $a_0=1$, the output signal of the OR-gate 39 also depends on the preceding bit $T_{-1}$, specifically on the output $C_{-1}$. If for aid bit $T_{-1}$ the output of $C_{-1}$ is zero, the output signal of the OR-gate will also be zero. If the output $C_{-1}$ is equal to one, the output signal of the OR gate 39 will become equal to that occurring during the preceding bit. The decoded bit thus becomes equal to the previously decoded bit. If the output $c_0$ of the decision point 36 is "1", the output of the OR-gate 39 will be "zero" if $a_{-1}=0$ and equal to $\bar{Q}_{-1}$, i.e. equal to the inverse logic level of the preceding bit $T_{-1}$, if $a_{-1}=1$.

As can be demonstrated by means of an arbitrary bit pattern, this yields an unambiguous and very simple method of decoding the information signal encoded in accordance with the invention, which provides a correct decoding both of the data bits encoded in accordance with the normal Miller method and of the modified data bits with a minimum of logic circuitry.

What is claimed is:

1. A method of encoding digital data for recording on a record carrier, said data being defined by a stream of data bits of a first and second type which are encoded as signal level transitions or absence thereof in consecutive bit cells each associated with a respective one of the data bits in said stream, said method comprising the steps of:

produce a signal level transition in the middle of an associated bit cell upon occurrence of a data bit of said first type in said stream, producing a signal level transition in the beginning of an associated bit cell upon occurrence of a data bit of the second type in said stream unless said second type data bit immediately follows a data bit of said first type in said stream, in which event no transition is produced in the bit cell associated with that second type bit, and upon each occurence in said stream of a bit string consisting of one data bit of said second type immediately followed by only two consecutive data bits of said first type, suppressing the production of a transition in the middle of the two cells associated with said two data bits of said first type in that string and producing a transition in the beginning of the bit cell associated with the second data bit of said two data bits of said first type in that string and upon occurrence in said stream of a bit string consisting of one data bit of said second type immediately following by n consecutive data bits of said first type, where n is an even number equal to or greater than four, suppressing the production of a transition in the middle of each of the two cells associated with the first and second data bits of said first type in that string and producing a transition in the beginning of the bit cell associated with the second data bit of said first type in that string so as to reduce the d.c. component in the encoded signal.

2. A method of encoding digital data for recording on a record carrier, said data being defined by a stream of data bits of a first and second type which are encoded as signal level transitions or absence thereof in consecutive bit cells each associated with a respective one of said data bits in said stream, said stream being comprised of consecutive words of a first and second type, said words of said first type consisting of one or more consecutive bits of the second type and the words of said second type consisting of one data bit of the second type immediately followed by one or more consecutive data bits of the first type, said method comprising the steps of:

producing a signal level transition in the middle of an associated bit cell upon occurrence of a data bit of said first type in said stream, producing a signal level transition in the beginning of an associated bit cell upon occurrence of a data bit of the second type in said stream unless an immediately preceding bit cell contains a transition in the middle thereof, in which event no transition is produced in the beginning of the bit cell immediately following said preceding bit cell, and upon occurrence of each word of said second type having only two consecutive data bits of said first type, suppressing the production of a transition in the middle of the two cells associated with the two data bit of the first type in that word and producing a transition in the beginning of the bit cell associated with the second data bit of said first type in that word and upon occurrence in said stream of each word of said second type having n consecutive data bits of said first type, where n is an even number equal to or greater than four, suppressing the production of a transition in the middle of each of the two cells associated with the first and second data bits of said first type in that word and producing a transition in the beginning of the bit cell associated with the second data bit of said first type in that word so as to reduce the d.c. component in the encoded signal.

3. An apparatus for encoding a stream of data bits of a first and second type as signal level transitions or absence thereof in consecutive bit cells defined by consecutive intervals of a clock signal, said apparatus comprising:

a first input for receiving the stream of data bits, a second input for receiving the clock signal which is in synchronism with the data bits, means for generating a signal transition in the middle of a clock interval upon occurrence of a data bit of the first type in said stream, means for generating a signal transition at the beginning of a clock interval upon occurrence of a data bit of the second type in said stream, means for suppressing the generation of a signal transition at the beginning of a clock interval upon occurrence of a transition in the middle of the immediately preceding clock interval, means for detecting a sequence of an even number of consecutive data bits of the first type in said stream, means for suppressing the generation of transitions in the middle of the clock interval corresponding to the first and second bits of the first type in said sequence, means for generating a transition at the beginning of the clock interval corresponding to said second bit of the first type in said sequence, and an output for supplying the encoded signal to a recording device for recording said signal on a record carrier.

4. An apparatus for decoding information represented by a stream of data bits recorded on a record carrier as level transitions in a sequence of bit cells each associated with a respective one of said data bits, the information content of each bit cell being represented by the presence and location or absence of a level transition in the bit cell, said apparatus comprising:

means for converting a bit cell with a transition in the middle of the bit cell into a data bit of logic value "one", means for converting a bit cell with a transition at the end into a data bit with a logic value which is the inverse of that of the decoded preceding data bit if the preceding bit cell does not have a transition in the middle and no transition at the end, and into a data bit of logic value "zero" if the preceding bit cell does exhibit one of said transitions, and means for converting a bit cell without transition in the middle and at the end into a data bit of a logic value identical to that of the decoded preceding data bit if the preceding bit cell exhibits a transition at the end and into a data bit of the logic value "zero" if said preceding bit cell does not exhibit said transition at the end.

* * * * *